US010123262B2

(12) United States Patent
Kuehnel et al.

(10) Patent No.: US 10,123,262 B2
(45) Date of Patent: **\*Nov. 6, 2018**

(54) GATEWAY ADVERTISEMENT IN A WIRELESS MESH

(71) Applicant: MICROSOFT TECHNOLOGY LICENSING, LLC, Redmond, WA (US)

(72) Inventors: Thomas W. Kuehnel, Seattle, WA (US); Alok Manchanda, Redmond, WA (US); Taroon Mandhana, Redmond, WA (US); Amer A. Hassan, Kirkland, WA (US); Mukesh Karki, Bellevue, WA (US); Christian Huitema, Redmond, WA (US); Yusuf Atas, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,714

(22) Filed: Oct. 13, 2016

(65) Prior Publication Data

US 2017/0034773 A1     Feb. 2, 2017

Related U.S. Application Data

(63) Continuation of application No. 14/641,808, filed on Mar. 9, 2015, now Pat. No. 9,474,015, which is a
(Continued)

(51) Int. Cl.
*H04W 48/16* (2009.01)
*H04L 12/24* (2006.01)
(Continued)

(52) U.S. Cl.
CPC .............. *H04W 48/16* (2013.01); *H04L 41/00* (2013.01); *H04L 41/0806* (2013.01);
(Continued)

(58) Field of Classification Search
None
See application file for complete search history.

(56) References Cited

U.S. PATENT DOCUMENTS

| 6,421,731 B1 | 7/2002 | Ciotti et al. |
| 6,532,368 B1 | 3/2003 | Hild |

(Continued)

FOREIGN PATENT DOCUMENTS

WO     2010052523 A1    5/2010

OTHER PUBLICATIONS

U.S. Appl. No. 12/392,728, filed Feb. 25, 2009, Kuehnel.
(Continued)

*Primary Examiner* — Eunsook Choi
(74) *Attorney, Agent, or Firm* — Mark K. Young; Mayer & Williams PC

(57) ABSTRACT

A computing environment containing a mesh network that is adapted to provide a reliable transport mechanism over which services may be delivered. Nodes of the mesh can automatically select routable addresses without conflicts, which allows nodes of the mesh to be accessed, even as the mesh changes through the addition or deletion of nodes. Also, nodes communicate with a protocol that supports service advertisements. These advertisements can identify mesh nodes that supply services, such as file or print servers, for which devices that have not yet connected to the network may be searching Advertisements can also identify services to be used by nodes in the network, allowing, for example, a node to select a gateway providing a reliable connection to an external network. The mesh network can be used as a
(Continued)

transport for communication using protocols, such as TCP/IP, that generally exhibit poor performance when using unreliable transports.

20 Claims, 6 Drawing Sheets

Related U.S. Application Data continuation of application No. 12/392,728, filed on Feb. 25, 2009, now Pat. No. 8,976,795.

(51) Int. Cl.

| | |
|---|---|
| *H04W 4/02* | (2018.01) |
| *H04W 48/00* | (2009.01) |
| *H04W 84/18* | (2009.01) |
| *H04L 29/08* | (2006.01) |
| *H04W 4/08* | (2009.01) |
| *H04W 8/18* | (2009.01) |
| *H04W 80/06* | (2009.01) |
| *H04L 29/06* | (2006.01) |

(52) U.S. Cl.
CPC .......... *H04L 41/0816* (2013.01); *H04L 67/16* (2013.01); *H04L 69/161* (2013.01); *H04W 4/02* (2013.01); *H04W 4/08* (2013.01); *H04W 8/18* (2013.01); *H04W 48/17* (2013.01); *H04W 84/18* (2013.01); *H04L 41/0809* (2013.01); *H04L 69/16* (2013.01); *H04W 80/06* (2013.01)

(56) References Cited

U.S. PATENT DOCUMENTS

| | | | |
|---|---|---|---|
| 6,728,232 | B2 | 4/2004 | Hasty, Jr. |
| 6,853,639 | B1* | 2/2005 | Watanuki ............ H04L 12/185 370/390 |
| 6,879,574 | B2 | 4/2005 | Naghian |
| 7,254,614 | B2* | 8/2007 | Mulligan ............ H04L 12/1859 709/207 |
| 7,649,872 | B2 | 1/2010 | Naghian |
| 7,675,863 | B2 | 3/2010 | Werb |
| 8,169,970 | B2 | 5/2012 | Ikeda |
| 2002/0075836 | A1 | 6/2002 | Uematsu |
| 2002/0097728 | A1 | 7/2002 | Hinderks |
| 2003/0095540 | A1 | 5/2003 | Mulligan |
| 2004/0109455 | A1 | 6/2004 | Jouppi |
| 2005/0018645 | A1 | 1/2005 | Mustonen |
| 2005/0078644 | A1 | 4/2005 | Tsai |
| 2005/0232186 | A1* | 10/2005 | Karaoguz ............ H04L 29/06027 370/328 |
| 2005/0243818 | A1 | 11/2005 | Foglar |
| 2006/0002366 | A1 | 1/2006 | Kawaguchi et al. |
| 2006/0126619 | A1 | 6/2006 | Teisberg |
| 2006/0187858 | A1* | 8/2006 | Kenichi ............ H04L 12/5692 370/254 |
| 2006/0242287 | A1 | 10/2006 | Cetin |
| 2006/0251088 | A1 | 11/2006 | Thubert |
| 2006/0268766 | A1 | 11/2006 | Rangarajan |
| 2007/0141986 | A1 | 6/2007 | Kuehnel |
| 2007/0141988 | A1* | 6/2007 | Kuehnel ............ H04W 8/005 455/41.2 |
| 2007/0149122 | A1 | 6/2007 | Murphy |
| 2007/0211736 | A1 | 9/2007 | Sapek |
| 2007/0263572 | A1 | 11/2007 | Ren et al. |
| 2007/0286094 | A1 | 12/2007 | Wigglesworth |
| 2007/0286100 | A1 | 12/2007 | Saaranen |
| 2007/0297430 | A1 | 12/2007 | Nykanen et al. |
| 2008/0008183 | A1* | 1/2008 | Takagaki ............ H04L 45/00 370/392 |
| 2008/0025208 | A1 | 1/2008 | Chan |
| 2008/0032738 | A1 | 2/2008 | Boyer et al. |
| 2008/0043638 | A1 | 2/2008 | Ribiere |
| 2008/0112363 | A1 | 5/2008 | Rahman et al. |
| 2008/0232272 | A1 | 9/2008 | Gelbman et al. |
| 2008/0240078 | A1* | 10/2008 | Thubert ............ H04W 40/08 370/351 |
| 2008/0242222 | A1 | 10/2008 | Bryce |
| 2008/0267147 | A1 | 10/2008 | Niranjan |
| 2008/0273486 | A1 | 11/2008 | Pratt et al. |
| 2008/0291855 | A1 | 11/2008 | Bata et al. |
| 2008/0304427 | A1 | 12/2008 | Biswas et al. |
| 2008/0304485 | A1 | 12/2008 | Sinha et al. |
| 2009/0043911 | A1 | 2/2009 | Flammer et al. |
| 2009/0129382 | A1* | 5/2009 | Elias ............ H04L 12/1886 370/390 |
| 2009/0175208 | A1 | 7/2009 | Thubert |
| 2009/0268652 | A1* | 10/2009 | Kneckt ............ H04W 52/0235 370/311 |
| 2009/0307371 | A1 | 12/2009 | Okazaki |
| 2010/0080144 | A1* | 4/2010 | Greenberg ............ H04L 12/1863 370/253 |
| 2010/0214959 | A1 | 8/2010 | Kuehnel |
| 2010/0214979 | A1* | 8/2010 | Kuehnel ............ H04L 41/00 370/328 |
| 2010/0215019 | A1 | 8/2010 | Velev et al. |
| 2010/0217655 | A1 | 8/2010 | Kuehnel |
| 2010/0238811 | A1 | 9/2010 | Rune |
| 2011/0004913 | A1 | 1/2011 | Nagarajan et al. |
| 2011/0130197 | A1 | 6/2011 | Bytnar |
| 2013/0151675 | A1 | 6/2013 | Kuehnel |
| 2014/0372232 | A1 | 12/2014 | Kuehnel et al. |

OTHER PUBLICATIONS

U.S. Appl. No. 14/641,808, filed Mar. 9, 2015, Kuehnel.
U.S. Appl. No. 12/392,752, filed Feb. 25, 2009, Kuehnel.
U.S. Appl. No. 14/477,567, filed Sep. 4, 2014, Kuehnel.
U.S. Appl. No. 12/392,777, filed Feb. 25, 2009, Kuehnel.
U.S. Appl. No. 13/728,527, filed Dec. 27, 2012, Kuehnel.
Thomson, "IPv6 Stateless Address Autoconfiguration", IBM, Network Working Group, Dec. 1998.
"DHCP Automatic Client Configuration," http://msdn.microsoft.com/en-us/library/aa505959(printer).aspx, 2009 Microsoft Corporation, downloaded Feb. 3, 2009, pp. 1-2.
Camp, "The IEEE 802.11s Extended Service Set Mesh Networking Standard", Communications Magazine, IEEE (vol. 46, Issue 8), Aug. 2008.
Microsoft, Wireless LAN API (KB918997), http://www.microsoft.comidownloads/details.aspx?familyid=52a43bab-dc4e-413f-ac71-158efdlada50&displaylang.=en, downloaded Dec. 22, 2008, pp. 1-2.
Clausen et al., Eds., "Optimized Link State Routing Protocol (OLSR)," The Internet Society, Project Hipercom, INRIA, Network Working Group, Oct. 2003, http://www.ietf.org/rfc/rfc3626.txt, downloaded Dec. 22, 2008, pp. 1-58.
Kawadia, V., "Protocols and Architecture for Wireless Ad Hoc Networks," Dissertation for Department of Electrical and Computer Engineering, University of Illinois at Urbana-Champaign, 2004, http://decision.csl.uiuc.edu/-prkumar/ps_files/04_07 kawadia_thesis.pdfm, downloaded Dec. 22, 2008, pp. 1-172.
Lhotka et al., Eds., "Networking Studies II: Selected Technical Reports," 1st Ed., CESNET, Prague, Czechoslovakia, 2008, http://www.cesnet.cz/doc/2008/networking-studies/networking-studies-08.pdf, downloaded Dec. 22, 2008, pp. 1-207.
"Complete Protocol Dictionary, Glossary and Reference—D," Network Dictionary, 2008, http://www.networkdictionary.com/protocols/d.php, downloaded Dec. 22, 2008, pp. 1-6.
Lin, C-H, "An Architecture for a Campus-Sized Wireless Mobile Network," Ph.D. Thesis, Dec. 1996, Purdue University, http://www.sigmobile.org/phd/9697/theses/lin.pdf, downloaded Dec. 22, 2008, pp. 1-157.
"Apipa," http://msdn.microsoft.com/en-us/library/aa505918(printer).aspx, 2009 Microsoft Corporation, downloaded Feb. 3, 2009, pp. 1-2.

(56) References Cited

OTHER PUBLICATIONS

United States Patent and Trademark Office, U.S. Non-Final Rejection for U.S. Appl. No. 14/477,567, dated Jul. 28, 2017, 17 pages, Alexandria, Virginia, United States.

* cited by examiner

GATEWAY ADVERTISEMENT IN A WIRELESS MESH

RELATED APPLICATION(S)

This Application is a Continuation of and claims benefit from U.S. patent application Ser. No. 14/641,808 that was filed on Mar. 9, 2015, and that is a Continuation of U.S. patent application Ser. No. 12/392,728 (U.S. Pat. No. 8,976, 795), filed Feb. 25, 2009 (issued Mar. 10, 2015), each of which is incorporated herein by reference in its entirety.

BACKGROUND

Devices connected to computer networks have a need for a unique network address in order to communicate on the network. In many networks, the network address is allocated or assigned automatically, avoiding the need for manual configuration by a user. The automatic allocation of addresses is typically centralized in a dedicated device on the network that provides an address-assignment service, such as the Dynamic Host Configuration Protocol (DHCP). The use of a centralized address-assignment service avoids the occurrence of network address conflicts.

Various types of computer networks exist. A traditional computer network includes network infrastructure, such as routers and switches, as well as dedicated devices providing network services such as DHCP.

A mesh network is a self-learning network of loosely connected computing devices. The devices connected to the mesh typically distribute packets throughout the mesh, allowing for the network to operate with limited or no infrastructure. The mesh network requires no maintenance, and can be very robust if a sufficient density of connected computing devices has been achieved. Mesh networks are particularly useful in developing countries lacking the infrastructure to form a traditional computer network.

Some computing devices may offer a service to other devices, such as a DHCP service, a data storage service, or a printing service. It is often desirable for such a device to advertise to other devices the service(s) it provides. For example, a router in a network may advertise its routing capability to other devices using a protocol such as the Internet Control Message Protocol (ICMP). An ad-hoc device, such as a device operating over the Bluetooth® protocol may also advertise a service it provides. For example, a cellular phone capable of exchanging data over a cellular network may advertise that capability over a Bluetooth® protocol to other devices. A Bluetooth® equipped laptop computer, for example, could then connect to external networks through the cellular phone to exchange data with other computers.

SUMMARY

A mesh network is adapted to act as a reliable transport, despite the varying and ad hoc nature of a mesh network. For example, the mesh may be adapted to serve as a transport mechanism for communications using TCP/IP or other higher level protocols or may allow devices to use services provided by mesh nodes, even when out of range of wireless communication range with those mesh nodes.

In one aspect, the mesh can be used as an access network to other networks. A node in the mesh that can serve as a bridge to another network advertises over the mesh that it is capable of acting as a gateway. Other nodes in the network can receive such advertisements, and use them to select a gateway for communication outside the mesh.

The advertisements may provide information that allows each node in the mesh to select a desirable gateway node as its default gateway. Part of this information may be contained with the advertisements themselves. Though, another part of this information may be obtained from the timing with which advertisements are received.

Information in the advertisement may identify characteristics of the path between the gateway and the node receiving the advertisement. For example, the advertisement may indicate a number of hops in the path. Such information may be incorporated into an advertisement by the operation of nodes in the mesh network as the advertisement propagates through the mesh network. For example, the advertisement may be generated by a gateway node with a null value in a hop count field. As each node receives an advertisement, it may increment the hop count field and then forward the advertisement to other nodes in the mesh network.

Timing related to receipt of advertisements may also be used in selecting a default gateway. Each gateway may generate advertisements repeatedly at intervals that will allow a node to identify whether the path through the mesh network to the gateway has been lost or, as a result of mesh reconfiguration, changed. Each node may repeatedly update its selection of a default gateway, selecting as a default a gateway that is reachable over an efficient path. The gateway selection may change at the transport level faster than a change in the default gateway that might otherwise occur as a result of a communications failure at a higher protocol layer when a default gateway becomes unavailable. As a result, the mesh network provides a reliable transport for any communications through the selected gateway.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5A is a method of advertising services to computing devices outside the mesh network;

FIG. 5B is an alternate method of advertising services to computing devices outside the mesh network.

DETAILED DESCRIPTION

Figure 1:
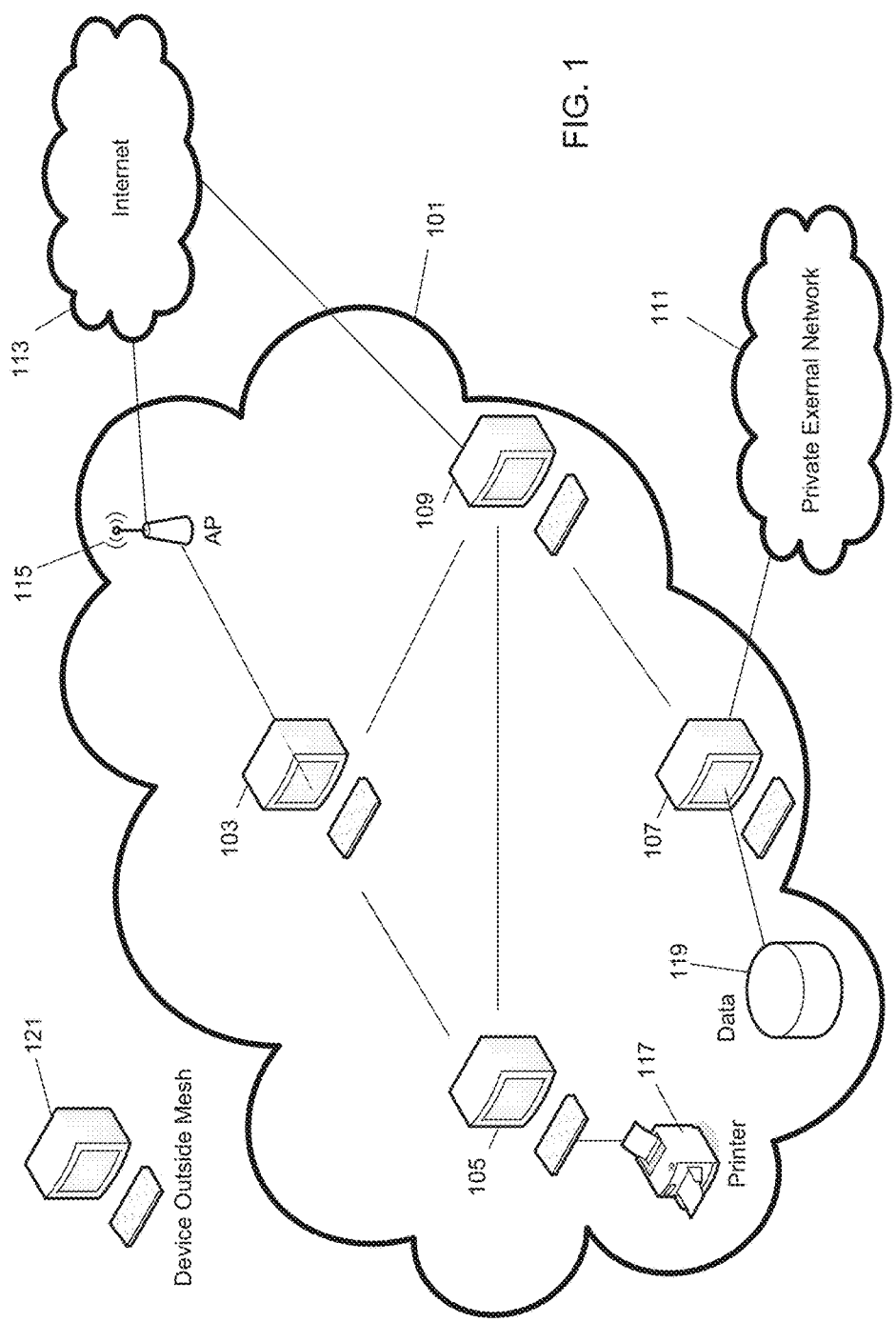
FIG. 1 is a diagram of a computing environment in which the invention may be practiced.

The inventors have recognized and appreciated modifications of conventional mesh networks that can enable the network to be used to support services in scenarios where the ad hoc and unreliable characteristics of those networks would otherwise not be acceptable. In this way, the relative flexibility and ease of creation of mesh networks can be leveraged to deliver services in a wide range of locations, even where network infrastructure has not yet been deployed or is unaffordable or otherwise unavailable.

One adaptation that may be incorporated into a mesh network is the self assignment of addresses for nodes on the network so that each node can be uniquely identified, either by other nodes on the network or devices outside the network that may wish to obtain services that require communication with nodes on the mesh. Such self-assignment may be performed in a way that avoids conflicts, even as the network grows, splits or reconfigures as nodes join and leave the mesh network.

A further adaptation that may be incorporated into a mesh network is the advertisement of services to devices outside the network. Nodes of the mesh may advertise to other nodes on the mesh the services they provide. Nodes that can act as an access point to the mesh network may collect and aggregate such advertisements. The aggregated advertisements, identifying services available through the mesh, may be distributed to computing devices that have not yet joined the mesh network. Other devices outside the mesh network may use the aggregated advertisements to locate services, and the services may be used as criteria for joining the mesh network.

Further, a mesh network may be adapted to support reliable connections through the mesh to gateways for another network. These connections may be formed by allowing each node to select as a default a gateway that can be reliably reached from that node. The selection may be changed with a frequency that helps ensure that there will be a reliable gateway selected for communication even if changes in the mesh network disrupt communication with some gateways.

Selection of a default gateway may be enabled by configuring gateway nodes to repeatedly advertise their presence. Information associated with the advertisements may then be used to enable other nodes to keep their selection of a gateway node current.

These adaptations may be used separately or in any combination to facilitate use of the mesh network in ways that mesh networks are not normally used. For example, the mesh network may be used as a transport for higher level network protocols. As a specific example, TCP/IP communications generally perform poorly over unreliable transports. Communications using TCP/IP and other protocols that require delivery confirmation experience delays when a message is not delivered as a result of a node in a communication path being unavailable. One cause of delay is that, when the message does not reach its intended destination, no message acknowledgement is received. In this case, the sending device waits until a time out period expires and may attempt several retransmissions until the sending device determines that communication over the initially selected path has failed and reconfigures itself to use a different path. By selecting as a default a gateway, or other node that provides a service, based on the reliability and the availability of a connection to that node, and by updating the selection more frequently than the time it would otherwise take to identify failure along a path, reliable communication can be maintained.

Alternatively or additionally, a mesh network according to some embodiments may expand the physical radius around a file server or print server from which other computing devices can access such services.

These and other functions may be implemented using a mesh network that has been adapted for reliable communication.

FIG. 1 illustrates a computing environment in which the invention may be practiced. The computing environment of FIG. 1 includes a mesh network 101, which includes a plurality of mesh nodes, such as mesh nodes 103, 105, 107 and 109. While the mesh nodes 103, 105, 107 and 109 are illustrated in FIG. 1 as the same type of computing device, they may be any suitable computing device, such as laptop computer, desktop computer, PDA, mobile device, or smart phone, capable of communicating over a computer network. The mesh nodes may be loaded with software, written in any suitable language, including as an operating system, such as variants of the WINDOWS® operating system developed by Microsoft Corporation. The mesh nodes may be configured through any suitable combination of software or hardware to exchange and forward network packets with one another through the mesh network over any suitable computer communications medium, including wired communication or wireless communication, as the invention is not limited, in this respect. In the embodiments of the invention described below, the mesh networks communicate over a wireless medium, such as the 802.11s variant of the wireless Ethernet protocol. However, any suitable protocol may be used for communication between mesh nodes.

The mesh network may include one or more specially configured mesh nodes, called gateway nodes or mesh portal points, that are connected to one or more computer networks outside the mesh network. A gateway node bridges the mesh network with an external network, allowing other mesh nodes to communicate with devices outside the mesh. The external network could be an infrastructure network, such as the Internet, but the external network could also have other forms. When a user of a mesh node that is not a gateway node has a need to communicate with a device outside the mesh, the mesh node can direct a network packet to an appropriate gateway node that forwards the network packet to the computing device outside the mesh. Packets sent from a computing device outside the mesh that are destined for a mesh node are directed to the gateway node, which may then forward the packets to the appropriate mesh node. The forwarding functionality of the gateway node may be done in any suitable way, including by using network address translation (NAT), as is known in the art.

Three of the mesh nodes in the mesh network 101 in the example of FIG. 1 are configured as gateway nodes, gateway nodes 103, 107 and 109. However, other mesh networks in which the invention may be practiced may include a greater or lesser number of gateway nodes. By means of gateway nodes, a mesh network may be connected to multiple external networks, and multiple gateway nodes may be configured to access the same external network. In the example of FIG. 1, the mesh network 101 is connected to two separate external networks, private external network 111, and the Internet 113. A single gateway node 107 is illustrated as connected to the private external network 111, while two gateway nodes, gateway nodes 103 and 109, are illustrated as connected to Internet 113. The connection between a gateway node and an external network may be made in any suitable way, over any suitable communications medium, including wired and wireless communication, in the example illustrated in FIG. 1, gateway nodes 109 and 107 are connected to Internet 113 and private external network 111, respectively, through a wired communications medium, and gateway node 103 is connected to the Internet 113 over a wireless communications medium through an access point 115.

A mesh network typically has a more transient nature than a traditional network. For example, mesh nodes, including gateway nodes, may suddenly no longer be connected to the mesh network. In some environments in which the invention may be practiced, a mesh node may not provide any indication to other mesh nodes in the mesh network that it has left or has disconnected from the mesh network. A mesh node may leave the network for any number of reasons, both voluntary and involuntary. For example, a mesh node may suffer a hardware or software failure, or it may have been intentionally powered down by a user in order to transport the device configured as a mesh node to another location.

In addition, as mesh nodes leave the mesh network, it is possible for a mesh network to split into two or more disjoint mesh networks, in which the new resulting mesh networks may not include all the gateway nodes that belonged to the single mesh network. A mesh network may also join with another mesh network, which could result in an additional number of gateway nodes that could be available to a mesh network.

Accordingly, mesh nodes that rely on a gateway node for connectivity to devices on an external network may need a way to detect the presence or absence of gateway nodes in the mesh network. In some embodiments of the invention, each gateway node on a mesh network generates an advertisement, and may periodically transmit the advertisement to other mesh nodes, thereby alerting other mesh nodes of its continued presence. The advertisement may be transmitted according to any suitable protocol, such as ICMP. A mesh node may then track the gateways from which it has recently received an advertisement in order to take account of the gateways currently available on a mesh network.

If a mesh node has received an advertisement from more than one gateway, in some embodiments of the invention, the mesh node may select a single gateway as a default gateway. The default gateway may be the first gateway to which the mesh node forwards packets destined for a computing device on an external network. For example, a user of a mesh node, such as mesh node 105, may have a need to communicate with a computer outside the mesh over the Internet 113. Mesh node 105 may then be configured to direct a TCP/IP packet encapsulated for transmission over the mesh network to a particular gateway node connected to the Internet 113. While the mesh network 101 includes two gateway nodes connected to the Internet 113, the mesh node 105 may be configured to select only one of them, such as gateway node 109, as the default gateway node to which the mesh node 105 first directs packets destined to computers over the Internet. The selection of the default gateway node may be made in any suitable way. In some embodiments of the invention, the mesh node may select the default gateway node by taking into account characteristics of a network path between the mesh node and each gateway node.

Mesh nodes may provide additional services besides the connectivity to an external network that is provided by any gateway node. A mesh node providing a service may make the service available to other nodes in the mesh network. In the example illustrated by FIG. 1, mesh node 107 is connected to storage data 117, and provides data storage services to the mesh network, and mesh node 105 is connected to printer 119, and provides printing services to the mesh network. However, any suitable service may be provided by a mesh node, as the invention is not limited in this respect.

Due to the transient nature of many mesh networks, the services available in a mesh network can change over time. Thus, as with the availability of gateway nodes, it would be useful for a mesh node to have an accurate account of any services currently available to it on the mesh network. Accordingly, a mesh node, such as mesh nodes 105 and 107, that provides a service to other mesh nodes, may advertise the availability of that service to other nodes in the mesh network. An advertisement sent by a mesh node providing a service to other nodes in the mesh may be made over any suitable protocol. In some embodiments of the invention, the advertisements are sent using protocols at networking layer three or above, such as a Universal Plug and Play (UPnP™) Discovery Protocol or a Web Services Discovery (WSD) Protocol. Based on the advertisements it has recently received from other mesh nodes providing services, a mesh node may keep track of the services currently available on the mesh network.

Devices outside the mesh network may also have a need for certain services provided by the mesh network. For example, the computing environment illustrated by FIG. 1 also includes a computing device 121 that is outside the mesh network, but that may be within a geographical distance that includes the range of the mesh network 101. A user of the computing device 121 may have a need to print a document, but have no access to a printer. Accordingly, continuing in the current example, it would be useful for the computing device 121 to be able to have access to the printing service provided by the mesh node 105. However, because the computing device 121 is not part of the mesh network, it does not receive the service advertisements distributed by mesh node 105, and therefore has no knowledge of the availability of the printing service provided by the mesh network.

It may also be useful for users of devices outside the mesh network to be made aware of services provided by nodes in the mesh. In some embodiments of the invention, one or more of the mesh nodes may aggregate the advertisements received from other mesh nodes providing services, and convert the aggregated advertisements from the protocol in which they were received to a second protocol. In some embodiments of the invention, the second protocol may be a suitable protocol, such as a layer two networking protocol, in which a mesh node could communicate with a device such as the computing device 121 outside the mesh. The aggregated and converted advertisements may then be transmitted according to the second protocol to computing devices not in the mesh network. A user of a device outside the mesh network, such as the computing device 121, having been made aware of the services provided by the mesh network, may then choose to have the computing device join the mesh network in order to take advantage of any services provided by the mesh.

One of the services that is typically provided in a traditional network is the automatic assigning of a network address to a computing device that is unique on the network, which is often accomplished using the DHCP protocol. While it is also very useful for devices in a mesh network to be automatically assigned a unique network address, the use of the DHCP protocol is not well suited for a mesh network, because DHCP typically requires a dedicated server.

Accordingly, in some embodiments of the invention, a mesh node in a mesh network may be configured to automatically assign a network address to itself. It may compute a network address for itself using any suitable method, and start using that network address to communicate with other mesh nodes. If the mesh node detects that another mesh node is configured to use the same network address, it may then resolve the conflict by computing a different network address, and using that different network address to communicate with other mesh nodes. When a network address assigned to the mesh node does not cause conflicts with any other mesh nodes, in some embodiments of the invention, the mesh node may store the non-conflicting network address in suitable computer storage, such as a non-volatile memory. The mesh node may then re-use the stored network address the next time it needs to determine a unique network address such as the next time the mesh node is powered on.

Figure 2:
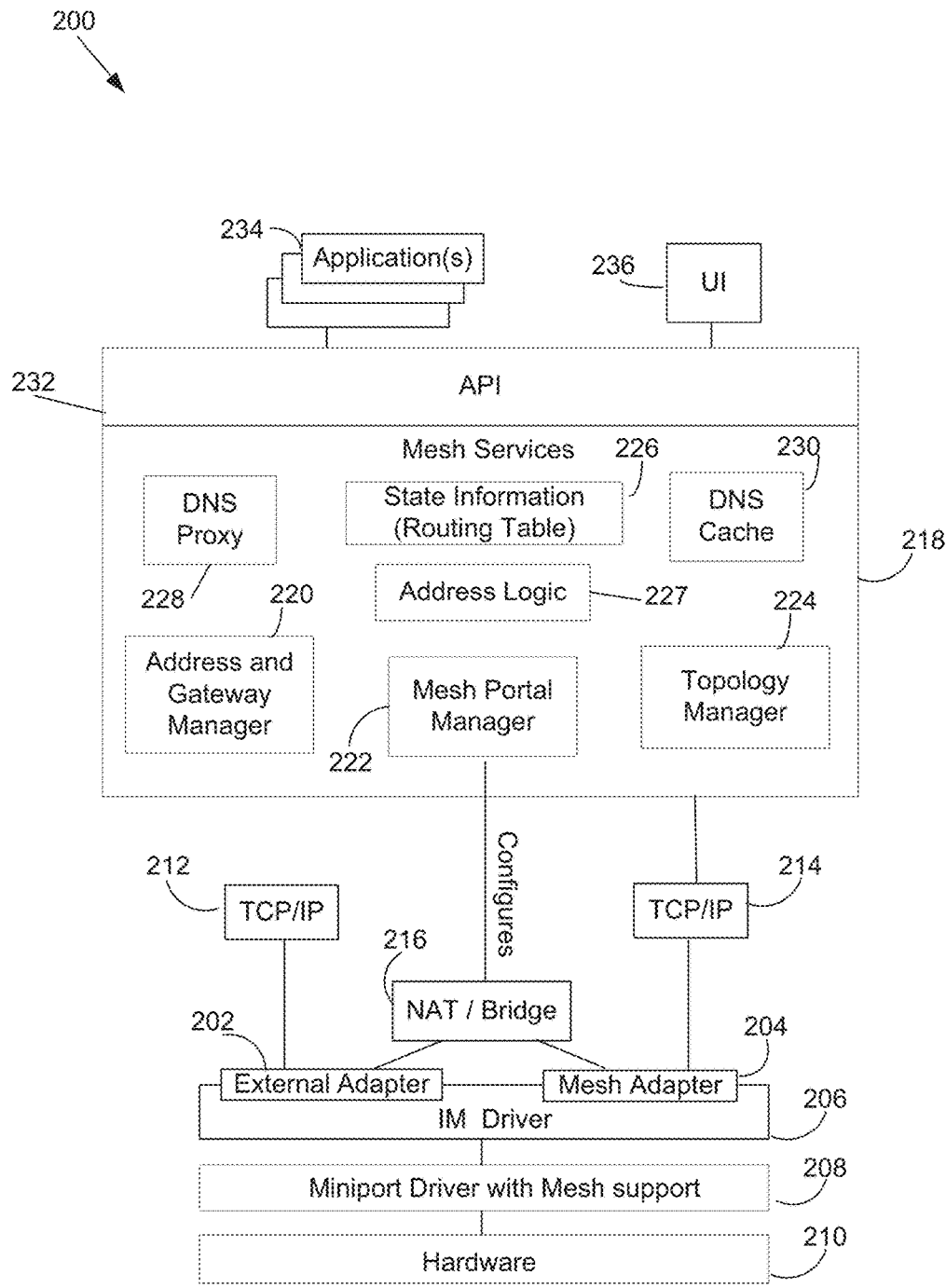
FIG. 2 is a block diagram of components to implement a gateway node according to some embodiments of the invention.

FIG. 2 illustrates a block diagram of components to implement a gateway node 200, such as one of gateway nodes 103, 107 and 109 in the example of FIG. 1, according to some embodiments of the invention. It should be understood that the number of components illustrated in FIG. 2 is not a limiting factor of the invention. The functionality ascribed to a single component illustrated in FIG. 2 could be implemented by multiple components, while multiple components in FIG. 2 could be implemented as a single component in other embodiments of the invention. Additionally, while in the embodiment of FIG. 2, the illustrated components except for hardware 210 are implemented in software developed in any suitable programming language executed on a processor within gateway node 200, many of these components may also be implemented in hardware, or in any suitable combination of hardware and software. In addition, many of the components described as applying to gateway 200 may also apply to a mesh node that is not a gateway node, such as mesh node 105, although some differences will be noted below.

The gateway node 200, as illustrated in FIG. 2, may bridge a mesh network with an external network, allowing mesh nodes to connect through it to the external network. In the embodiment of FIG. 2, the mesh network and the external network are illustrated as having separate network adapters, external adapter 202 and mesh adapter 204. While, the mesh adapter 204 may typically be a wireless network adapter, the invention is not limited in this respect, and in general, either adapter may be any suitable network adapter, supporting any suitable combination of wired or wireless network communication.

The external adapter 202 and the mesh adapter 204 may be any combination of hardware or software. They may be separate physical adapters, or one physical adapter implemented as two separate logical adapters. For example, the gateway node 200 may be loaded with software, that when executed on a processor, allows the same physical hardware to interleave operations for two or more network adapters, creating the appearance of more logical network adapters than may be apparent from the physical hardware. In the embodiment illustrated in FIG. 2, both external adapter 202 and mesh adapter 204 are two logical adapters exposed by an IM Driver 206, and are implemented using a single physical wireless network adapter. This may be done in any suitable way. In the embodiment illustrated in FIG. 2, the IM driver 206 multiplexes and demultiplexes data from both adapters and passes data to a miniport driver 208. The miniport driver 208 may interface with hardware 210, which may include the actual physical network adapter.

Network packets may be transmitted over external adapter 202 and mesh adapter 214 through one or more network stacks implemented on the gateway node 200. The example illustrated by FIG. 2 includes two network stacks, TCP/IP stack 212 for the external adapter 202, and TCP/IP stack 214 for the mesh adapter 204. The gateway node 200 may also include a bridge 216 for bridging the two networks, and for conveying network packets between a mesh node and a device on an external network. The bridge 216 may include NAT services to perform address mapping for addresses from the private interface (represented by the mesh adapter 204) to the public interface (represented by the external adapter 202). The address mapping may be done in any suitable way. In some embodiments of the invention, the mapping may only be kept alive for a certain period of time (e.g., 30 seconds) for UDP connections, while for TCP connections, the mapping may be maintained for the life of the connection. It is to be noted that a mesh node that is not a gateway node may only include one adapter, such as mesh adapter 204, and one TCP/IP stack, such as TCP/IP stack 214. A mesh node that is not a gateway node may also not include the bridge 216.

The gateway node 200 may also include mesh services 218, which may implement the management and configuration logic for the gateway node. The mesh services 218 may include an address and gateway manager (AGM) 220, a mesh portal manager (MPM) 222, a topology manager (TM) 224, state information 226, address logic 227, a DNS proxy 228, and a DNS cache 230. Mesh services 218 may expose an API 232 to application(s) 234 making use of mesh functionality and to a user interface 236, used for configuring and managing the mesh network.

The AGM 220 may implement the gateway advertisement protocol, generating advertisements, and periodically transmitting them to other mesh nodes. Mesh nodes may identify a node as a gateway node, such as gateway node 200, based on the receipt of a gateway advertisement from that node, and may accordingly select that gateway to direct packets to a computing device on an external network. The advertising functionality ascribed to AGM 220 may not be performed in a mesh node that is not a gateway node.

The AGM 220 may also generate and store state information 226 in a suitable format, such as a routing table, regarding gateway nodes for which it has received advertisements. The state information 226 may also include information about characteristics associated with the path between the current node and each gateway node from which it has received an advertisement.

The AGM 220 may also perform address configuration and duplicate address detection. In the case of a conflict between addresses on the mesh network and the external network, the AGM 220 may generate a notification, which could be used by the user interface 236 and address logic 227 to reconfigure the address.

In some embodiments of the invention, address logic 227 implements the functionality to generate and assign a unique network address for the current node, including resolving an address conflict, should it occur. It may store a known non-conflicting network address in a suitable computer storage medium on the gateway node 220, which could be a portion of the state information 226.

The MPM 222 may determine if the current node may be configured as a gateway node. This determination may be based at least in part on whether the current node has connectivity on two interfaces, such as external adapter 202 and mesh adapter 204. In the embodiment of the invention illustrated by FIG. 2, the MPM 222 may obtain connectivity information about the two interfaces from the IM driver 206. If it determines that the current node may be configured as a gateway node, such as is the case for gateway node 200 illustrated by FIG. 2, the MPM 222 may configure the bridge 216. In some embodiments of the invention, prior to bridging the two network interfaces, the MPM 222 may verify that the network address on the external network does not fall in the same range as network addresses on the mesh network. In the unlikely event that there is a conflict, in some embodiments of the invention, the bridge is not established between the two interfaces. If a conflict is detected, the MPM 222 may provide an indication to the user of the mesh node, such as through the user interface 236, that IT intervention may be required. Alternatively, two or more address ranges could be implemented for all devices in the mesh, in order to mitigate any conflict that may arise.

The TM 224 may be used for diagnostic purposes, and may aid a user in determining why a failure may be occurring on the mesh network. For example, it may provide the functionality to build a topology map of the mesh network and provide that to a user via the user interface 236. In conjunction with the TM driver 206, the TM 224 may also implement a trace route API that may collect information about mesh nodes it traverses, as well as timing information to reach a given destination.

The gateway node 200 may also contain a Domain Name System (DNS) proxy 228 that relays DNS requests sent by mesh nodes to a DNS server on the external network, and thus acts as a DNS resolver for the mesh nodes. For optimization, in some embodiments of the invention, the gateway mode may implement DNS information caching, such as via DNS cache 230. As is known in the art, DNS cache 230 may store the results of recently issued DNS requests in order to avoid having to issue the requests again to a DNS server on an external network. Thus, the DNS cache 230 can significantly improve the perception of connection speed on the mesh. DNS proxy and DNS cache 230 may be implemented in any suitable way, including using known techniques, and any suitable combination of software and computer storage media.

Figure 3A:
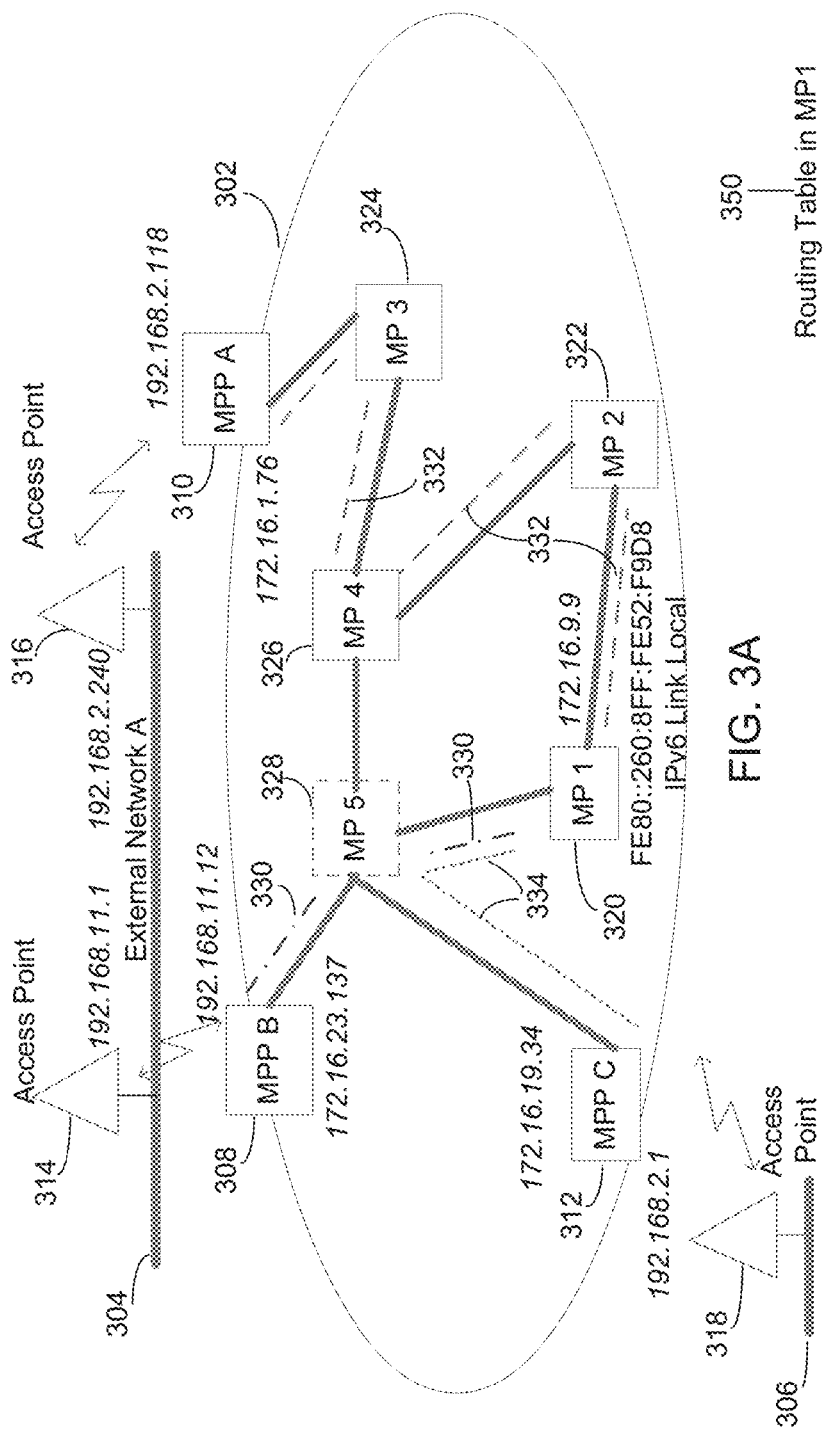
FIG. 3A is a diagram of a computing environment in which a mesh node may select a default gateway.

FIG. 3A illustrates a computing environment in which a mesh node may select a default gateway, according to some embodiments of the invention. FIG. 3A includes a mesh network 302, and two external networks, external network 304 and 306. The mesh network 302 includes three gateway nodes, gateway nodes 308, 310 and 312. Gateway nodes 308 and 310 are both connected to the external network 304, via access points 314 and 316, respectively. Gateway node 306 is connected to external network 306 through access point 318. The mesh network 302 also includes other mesh modes that are not gateway nodes, such as mesh nodes 320, 322, 324, 326 and 328, that may communicate with devices outside the mesh on external network(s) 304 and/or 306 using one or more of the gateway nodes on the mesh.

According to some embodiments of the invention, each of gateway nodes 308, 310 and 312 periodically broadcasts advertisements that are distributed to other nodes through the mesh. A mesh node may keep track of the gateway nodes from which it has received advertisements, such as by means of storing that information in a routing table in state information 226, in the example illustrated by FIG. 2. A mesh node may also associate one or more characteristics, such as a metric, with a path between itself and each gateway node for which it has received advertisements. The metric may be based on any suitable characteristics, such as the number of hops in the network path between itself and the gateway node, or the bandwidth, latency, or load associated with the network path. While in some embodiments of the invention, the metric may be calculated by the mesh node based on any suitable characteristics as described above, in some embodiments of the invention, the metric may alternatively or additionally be derived, at least in part, from information obtained from the gateway advertisement.

In some embodiments of the invention, when a mesh node receives an advertisement originating from a gateway node, it may forward the advertisement to other mesh nodes, with the addition of one or more associated characteristics. A mesh node may derive a metric by taking into account the additional associated characteristics in the advertisement. Any suitable additional characteristics may be included in the forwarded advertisement, including the number of hops the advertisement has traveled so far since it left the gateway node. In some embodiments of the invention, the metric is also stored with the state information, such as a routing table.

Figure 3B:
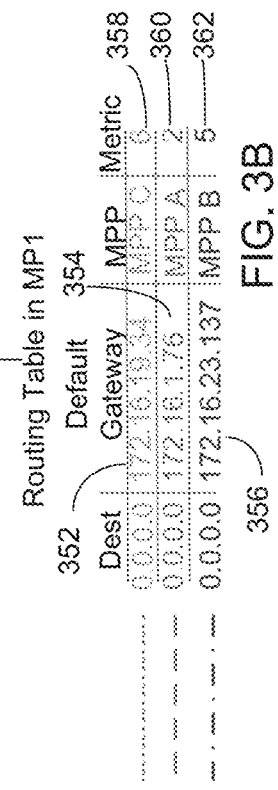
FIG. 3B is a diagram of a routing table for gateway nodes for a mesh node illustrated in the computing environment of FIG. 3A.

FIG. 3B illustrates a routing table 350 for the mesh node 320. Mesh node 320 has received an advertisement from all three gateway nodes in the mesh network, because all three gateway nodes are stored in its routing table. Each gateway is referenced in the routing table by a unique identifier, which may be any suitable identifier, such as the network address on the mesh network of the gateway. In the example of FIG. 3B, gateway network addresses 352, 354 and 356 for gateway nodes 312, 310 and 308, respectively, are stored in the routing table 350.

The routing table 350 also contains a metric for each of the three gateways based on characteristics of a path between the mesh node and the gateway node. FIG. 3A illustrates three paths between the mesh node 320 and three gateway nodes: a path 330, between the mesh node 320 and the gateway node 308, a path 332 between the mesh node 320 and the gateway node 310, and a path 334 between the mesh node 320 and the gateway node 312. Accordingly, each of these paths is associated with a metric that is stored in the routing table 350. For example, metrics 358, 360 and 362, associated with the paths to gateway nodes 312, 310 and 308, respectively, are stored in the routing table, and associated with the gateway nodes. In the example of FIGS. 3A and 3B, based at least in part on the metrics stored in the routing table 350, the mesh node 320 may select a default gateway node.

In some embodiments of the invention, more than one default gateway node may be selected. This may be appropriate, for example, if the mesh network has gateway nodes connected to two otherwise unconnected external networks. Some mesh nodes, according to some embodiments of the invention may also make use of multiple routing tables, for example, creating a separate routing table for each external network.

Figure 4:
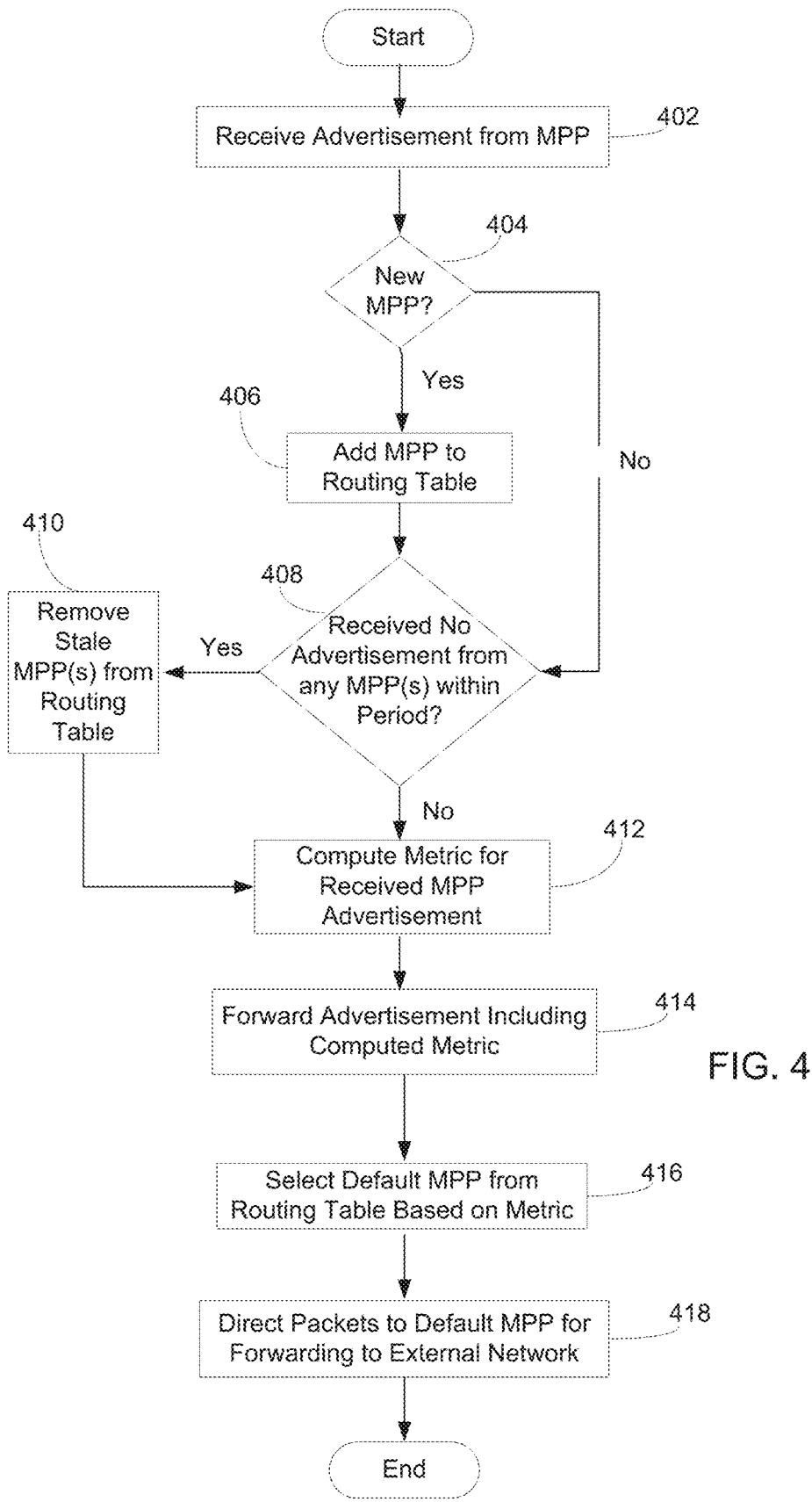
FIG. 4 is a flowchart of a method of selecting a default gateway node for a mesh node, according to some embodiments of the invention.

FIG. 4 is a flowchart of a method of selecting a default gateway node for a mesh node, such as mesh node 320 in FIG. 3A, according to some embodiments of the invention. It should be appreciated that while the embodiment of FIG. 4 describes the process in connection with selecting a gateway node, a similar process may be performed to select a default mesh node providing another type of service besides connectivity to an outside network, such as a DNS service. The method may be implemented in any suitable way, and in any suitable combination of hardware or software developed in any suitable programming language. In the embodiment of the invention illustrated by FIG. 2, a portion of the method may be implemented in the address and gateway manager 220.

In the embodiment illustrated by FIG. 4, the method may start at block 402, when a mesh node receives an advertisement originating from a gateway node, also known as a mesh portal point (MPP). The mesh node may be adapted to receive messages from other mesh nodes over a network adapter connected to the mesh network, such as mesh adapter 204 illustrated in FIG. 2. One or more of the messages received by the mesh node may be formatted to indicate that the message(s) corresponds to an advertisement transmitted by a gateway node. In other embodiments, however, the method illustrated by FIG. 4 may be invoked periodically by the mesh node, or may be invoked in response to other events besides the receipt of an advertisement from an MPP.

If the method is invoked in response to receiving an advertisement from an MPP, the advertisement may be generated and transmitted by the MPP according to any suitable protocol. The protocol may be a known protocol, including ICMP, or it may be a special purpose protocol developed for advertising gateway nodes in a mesh. Some embodiments of the invention may make modifications to a known protocol, such as through the use of option fields in a header of a message sent according to the known protocol.

Regardless of the type of protocol used, based on the received advertisement, the mesh node may identify the node that generated the mesh node as an MPP on the mesh network. In some embodiments of the invention, an MPP may also include in the advertisement additional information, such as a regular time period in which it broadcasts advertisements, a DNS server, or specific routes to reach specific computing devices on an external network to which the MPP is connected. The additional information may be included in the advertisement in any suitable way, including by making use of one or more option fields in the protocol, as described above.

Regardless of any additional information contained within the received advertisement, the mesh node then, at block 404, may check if the MPP is a new MPP. This may be done in any suitable way, including checking to see if the MPP from which it just received an advertisement is present in a routing table, such as routing table 350 illustrated in FIG. 3B. If the mesh node determines that the MPP is new, the process may proceed to block 406, in which the mesh node may add an entry for the MPP in the routing table. The entry in the routing table may take any suitable form, and may include an identifier, such as network address, for the MPP.

After the step at block 406 is performed, or if the mesh node had determined at block 404 that the MPP was not a new MPP, the MPP proceeds to block 408. At block 408, the mesh node may determine if it has not received an advertisement from any known MPP within an expected time interval. It may do this in any suitable way, including by checking all the gateway nodes in its routing table. In some embodiments of the invention, the expected time interval may be a value configured on the mesh node itself as applying to any MPP in the mesh, while in embodiments of the invention in which an MPP includes a time period in the advertisement, the value of the expected time interval may be based on time period included in the advertisement, and therefore, might be particular to that MPP. In embodiments in which the time period might be particular to an MPP, the mesh node may track that time period in a suitable location, such as the routing table.

If the mesh node determines at block 408 that it has not received an advertisement from any MPP(s) within an expected time period, this may be an indication that the stale MPP(s) are no longer active, and may have either left the mesh network, or have become unreachable from the mesh node. The mesh node may then proceed to block 410, in which it may update entries in the routing table for any stale MPP(s). The entries in the routing table may be updated in any suitable way. While the embodiment illustrated by FIG. 4 describes removing stale MPPs from the routing table, other embodiments of the invention may update the routing table in other ways. For example, the routing table in some embodiments of the invention may be ordered by priority. In such embodiments, the routing table may be updated to reflect stale MPP(s) by lowering the priority of the stale MPP(s), such as by adjusting a priority score in the routing table that may be associated with each MPP.

It is to be appreciated that the functionality ascribed to blocks 408 and 410 does not have to be performed in response to receiving an advertisement from an MPP. For example, In some embodiments of the invention, the functionality ascribed to blocks 408 and 410 may be executed periodically by the mesh node in order to periodically clean up stale entries in the MPP routing table for the mesh node. In addition, in some embodiments of the invention, an MPP may be removed, such as in block 410, from the routing table for other additional or alternative reasons. For example, if a mesh node determines that a network connection to a device outside the mesh network passing through a particular MPP has failed, it may remove that MPP from the routing table, and if appropriate, select a new default MPP.

Regardless of whether any stale MPP(s) were removed from the routing table in block 410, the process proceeds to block 412, in which the MPP may compute a metric for a path between itself and the MPP for which it just received an advertisement, and store the metric in the routing table. The metric may be determined in any suitable way, including being derived based on information obtained from the gateway advertisement and/or calculated based on any suitable characteristics, as discussed in conjunction with FIG. 3A.

The process may then proceed to block 414. In some embodiments of the invention, mesh nodes may forward any received advertisements originating from a gateway to other mesh nodes. In doing so, a mesh node may include additional characteristics associated with the path between itself and the MPP. Any suitable additional characteristics may be included in the forwarded advertisement, as discussed in conjunction with FIG. 3A, including a number of hops in a network path between the mesh node and the MPP.

At block 416, the process may then select a default MPP. This may be done in any suitable way, including based on information stored in the routing table, such as the computed metrics associated with the path to each MPP.

Once a default MPP is selected, in block 418, the process may then direct network packets to the default MPP when communicating with a computing device on an external network.

Figure 5:
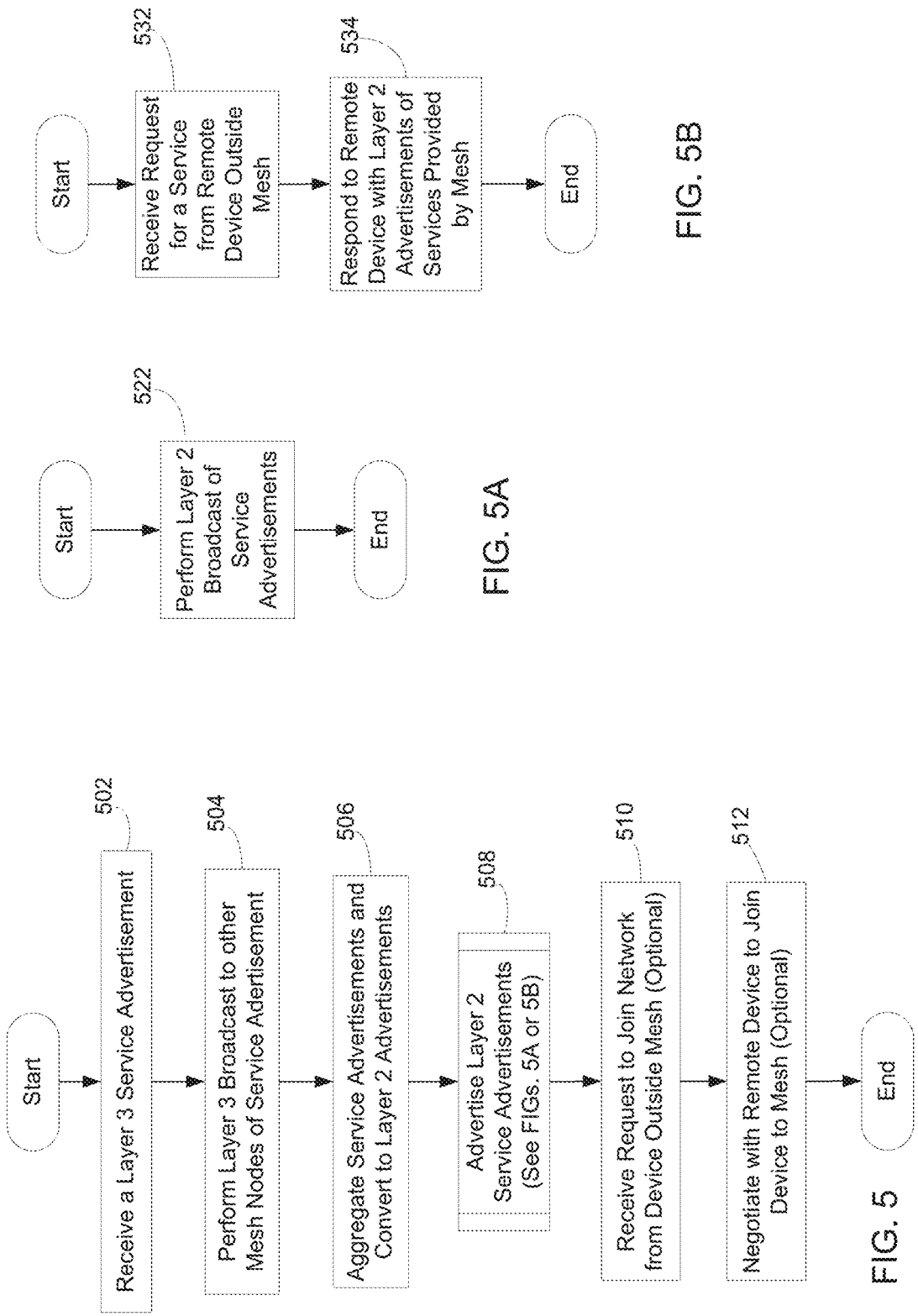
FIG. 5 is a flowchart of a method of distributing service advertisements throughout the mesh network, as well as to computing devices outside the mesh network.

Besides gateway nodes, which provide a service of enabling connectivity to an external network, other mesh nodes may also provide services, such as print and data services, that they advertise throughout the mesh network. In addition, it may also be useful for computing devices not on the mesh network but within range of the mesh network to ascertain, without having to connect to the mesh network, whether a service is available over the mesh. However, the protocols used to distribute the advertisements throughout the mesh typically cannot be used for devices not on the mesh network. FIG. 5 and associated FIGS. 5A and 5B illustrate a method of distributing service advertisements throughout the mesh network, as well as to computing devices outside the mesh network. FIGS. 5, 5A, and 5B may be implemented in any suitable combination of hardware or software developed in any suitable programming language.

The method of FIG. 5 may be implemented on any suitable mesh node. In some embodiments of the invention, only a subset of the mesh nodes in a mesh network may perform all the steps of the method illustrated by FIG. 5, while in other embodiments, the steps may be performed by each node in the mesh. The method may start at block 502, in which a mesh node receives at least one service advertisement from another node in the mesh. The received advertisement(s) were sent according to a first protocol, which in some embodiments of the invention may be a layer three network protocol, such as a Universal Plug and Play (UPnP™) Discovery Protocol or a Web Services Discovery (WSD) Protocol. In the case of an MPP advertisement, the protocol may also be an ICMP protocol in embodiments of the invention in which the advertisement is sent according to a protocol at a networking layer three or above, the advertisement may not have been received by any computing devices outside the mesh network.

At block 504, the mesh node may then broadcast the received advertisement to other mesh nodes, according to the first protocol, which may be a layer three networking protocol. The method then proceeds to block 506, in which the mesh node aggregates any layer three advertisements it has received, and converts them to a second protocol. The second protocol may be a protocol, such as layer two networking protocol, with which the mesh node is able to communicate with computing devices outside the mesh network. In some embodiments of the invention, the second protocol may be a variant of a wireless Ethernet protocol, such as an 802.11s protocol.

The method proceeds then to block 508, in which the mesh node advertises the services provided in aggregate by the mesh network according to the second protocol, which may be a layer two protocol. The services may be advertised according to the second protocol in any suitable way. FIGS. 5A and 5B each illustrate a different method of implementing block 508. Some embodiments of the invention may include only one of the two methods, while other embodiments may include both methods.

The method of FIG. 5A may be invoked on the mesh node by the implementation of the method of FIG. 5. At block 522, the method involves performing a layer two broadcast of the services provided in aggregate by the mesh network. Thus, any computing device not on the mesh network, but that is within range of the mesh node and is capable of communicating over the same layer two protocol may receive the advertisement broadcast by the mesh node. The layer two broadcast of the services may be performed over any suitable protocol. It may be part of a beacon or other wireless communication over a known protocol, such as a variant of wireless Ethernet (e.g., 802.11s). The layer two broadcast may be according to a standard protocol, but may utilize optional fields in the standard protocol to indicate services advertised. In other embodiments, the protocol may be a special purpose protocol that has defined fields for advertising in one message all the advertising services provided by the mesh, while in other embodiments according to some protocols, the services may be advertised sequentially in separate messages.

Regardless of the protocol used, besides broadcasting the available services, the broadcast performed at block 522 may also include a broadcast of the availability of the mesh network itself. Thus, a user of a computing device outside the mesh network may be made aware of the presence of the mesh network, as well as the services provided by the mesh network. The method of FIG. 5A is then complete, and process may then continue with block 510 of the process of FIG. 5.

The method of FIG. 5B may also be invoked on the mesh node by the implementation of the method of FIG. 5. At block 532, the method may receive a request for a particular service from a device outside the mesh network. The request may be sent according to any suitable layer two networking protocol, including a standard protocol, a variation of a standard, such as by the inclusion of optional fields, or a special purpose protocol, similar to the discussion in conjunction with FIG. 5A. For example, a user of a computing device that is interested in connecting to a mesh network only if the mesh offers printing capabilities, may configure his computing device to broadcast his intent using layer two discovery messages, such as a printer search equivalent. Such a request may have been received by the mesh node in block 532.

At block 534, the mesh node may respond according to a layer two protocol to the request of the computing device outside the mesh, in which the response contains advertisements of services provided by the mesh network. The response may be sent according to any suitable networking protocol. While in some embodiments of the invention, the response may be sent according to the same protocol used by the device outside the mesh network to send the request, the response may also be sent according to a different protocol than the request. The method of FIG. 5B may then be complete, and the process may then continue with block 510 of the process of FIG. 5.

Returning to FIG. 5, at block 510, the mesh node may then optionally receive a request to join the mesh network from a computing device outside the mesh. A user of the computing device outside the mesh may have chosen to issue the request to join the mesh as a result of having received an advertisement of the services provided by the mesh network. The process may then proceed to block 512, in which the mesh node may optionally negotiate with the device outside the mesh network to allow the device to join the mesh network. The step of block 512 may be performed in any suitable way, including known techniques for joining a mesh network, as the invention is not limited in this respect. The process illustrated by FIG. 5 may then have finished at this point.

While mesh nodes may provide numerous services, including gateway services, printing services, or data services, a mesh network may typically not provide a DHCP service. However, it may still be desirable for network addresses to be automatically assigned to nodes in a mesh network. Accordingly, FIG. 6 illustrates a method for a mesh node to automatically assign a unique network address to itself, including resolving any conflicts that may arise with other mesh nodes on the mesh network.

Figure 6:
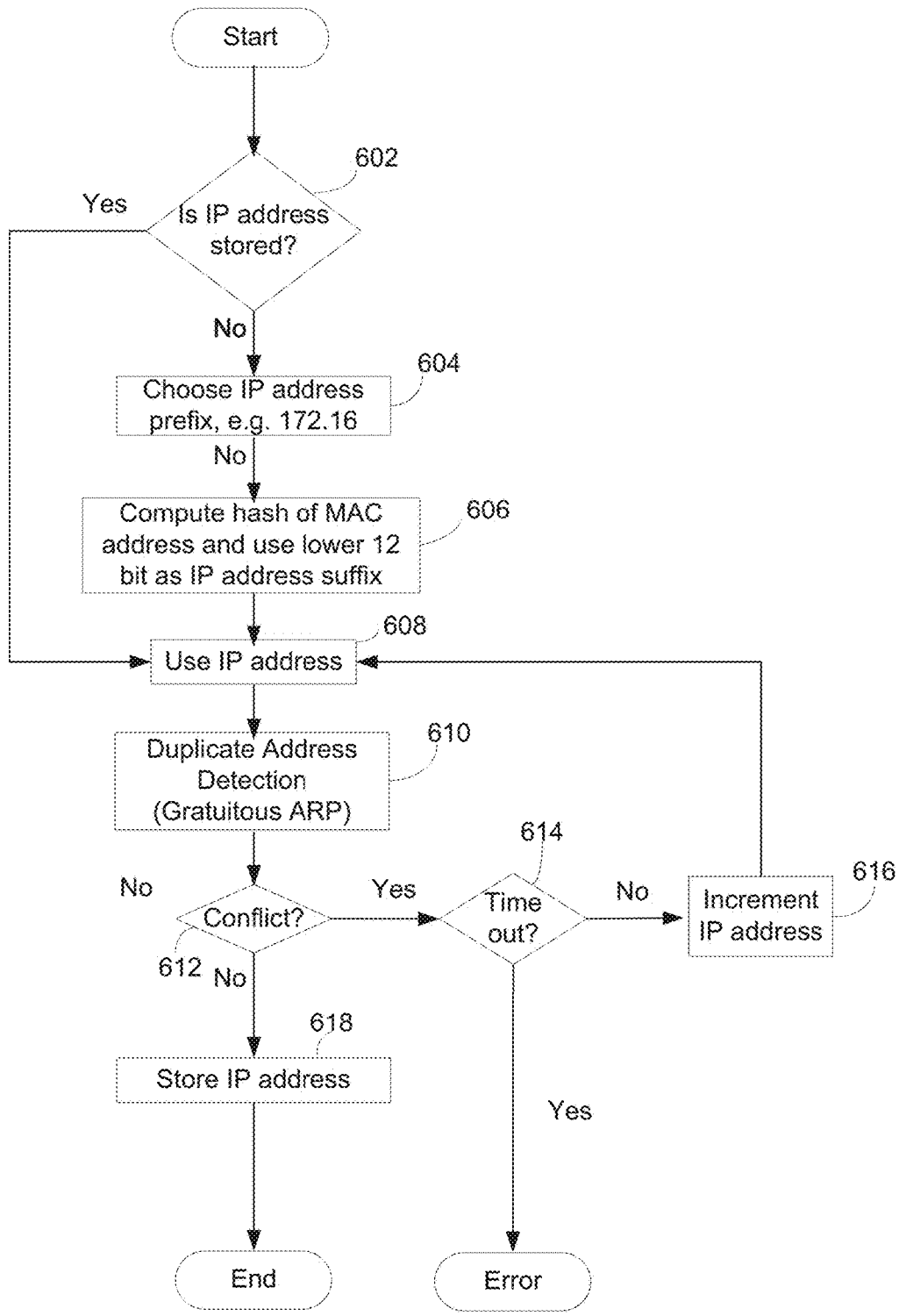
FIG. 6 is a method for a mesh node to automatically assign a unique network address to itself, including resolving any conflicts to may arise with other mesh nodes on the mesh network.

FIG. 6 may begin when a mesh node attempts to join the mesh network, whether that is for the first time, or after the mesh node has powered on, for example. The method illustrated by FIG. 6 may be implemented in any suitable way, including by the address logic 227 in the embodiment of FIG. 2. In the embodiment illustrated by FIG. 6, once the mesh node has determined a network address that is unique throughout the mesh, it may store that network address in a particular location in any suitable non-volatile computer storage medium. Accordingly, at block 602, the mesh node may check if a network address has been stored in the particular location. If a network address has been stored, the process may then proceed to block 608, in which the mesh node may optimistically assign the stored network address to itself under the assumption that the stored address is still unique throughout the mesh network. In block 608, the device may also start sending or receiving network packets with other mesh nodes based on the assigned network address.

Otherwise, if it is determined at block 602 that no network address has been stored in the particular location on the mesh node, the process proceeds to block 604, in which it may select a first portion of the network address, such as an IF address prefix. The IP address prefix may correspond to an identifier for a subnet for the mesh network, and shared among other mesh nodes in the mesh network. In some embodiments of the invention, the subnet may be preconfigured for a mesh node, and may be in any suitable range of private network addresses. In some embodiments, the address may have a prefix such as, 169.254.x.x, which is sometimes used for automatically assigned network addresses in other contexts. However, in some embodiments, the assigned addresses have a prefix corresponding to a private address space, such as 10.x.x.x, 172.16.x.x 192.168.x.x, allowing messages to be routed to nodes using NAT operations. The length of the prefix is not a limiting factor of the invention, and may be chosen based on a number of factors, including the number of expected nodes to which the mesh network is likely to grow. For example, if the prefix is of a length of 16 bits, in a 32-bit network address, this allows $2^{16}-1$ mesh nodes to be uniquely addressed in the mesh network.

The process may then proceed to block 606, in which the process may select a second portion of the network address, such as an IP address suffix. In the embodiment of the invention illustrated by FIG. 6, the second portion of the network address is intended to be unique across other mesh nodes. The network address suffix may be computed in any suitable way. In some embodiments of the invention, the suffix is computed by performing a hash operation on a unique identifier on the mesh node, such as a MAC address of a network interface on the mesh node. Because the MAC address is unique throughout the mesh network, a value computed based on the MAC address is also likely to be unique. However, other methods of selecting a unique suffix are possible, including manual assignment.

The process may then proceed to block 608 in which the mesh node may assign to itself the network address obtained based on the selected prefix and the computed suffix, and start sending or receiving network packets with other mesh nodes based on the assigned network address.

The process may then proceed to block 610, in which the mesh node may attempt to detect if the assigned network address conflicts with any other network addresses on the mesh. This may be done in any suitable way, including by using a duplicate address detection (DAD) protocol. DAD may be supported in the networking stack implementation of an operating system loaded on the mesh node, such as the WINDOWS XP® and WINDOWS VISTA® operating systems developed by Microsoft Corporation. DAD may be implemented in any suitable way, including by using a gratuitous Address Resolution Protocol (ARP). As is known in the art, ARP is usually employed for finding a computer's link layer address, such as a MAC address, when only its network layer address, such as an IP address, is known. A gratuitous ARP request is useful in that it is broadcast to all computers on a network. Thus, if a mesh node issues a gratuitous ARP request to all mesh nodes, in which the request contains the mesh node's newly self-assigned IP address as the source address in the request, any mesh node that is assigned the same IP address may detect an address conflict. In addition, nodes in the mesh may issue a reply to the ARP request. Based on the received replies, the mesh node can determine if any of the mesh nodes replying are assigned the same address as the address it just assigned to itself.

Regardless of the method of detecting a duplicate address in the mesh employed in block 610, at block 612, the mesh node may determine whether or not a conflict was detected in block 612, if a conflict was detected with another node on the mesh, the process proceeds to block 614, in which the mesh node may check to see whether it has exceeded a specified amount of time or a specified number of tries in determining a unique network address. The value for the specified amount of time or the specified number of tries may be obtained in any suitable way, including as a configurable setting on the mesh node. If the mesh node has exceeded the specified amount of time or the specified number of tries, the method may then terminate with an error.

Otherwise, the process may proceed to block 616 in which a new network address suffix may be selected. A new network address suffix may be selected in any suitable way, in some embodiments of the invention, the new MAC address suffix may be generated by incrementing the value of the conflicting suffix. In other embodiments, the mesh node may obtain a new suffix value, such as a random number, from a user of the mesh node.

In some embodiments of the invention, the steps performed by block 616 are only performed by a subset of any conflicting nodes on the mesh. For example, if the mesh node detects that its network address conflicts with a second mesh node on the mesh network, only one of the two mesh nodes may perform the steps in block 616. The determination regarding which subset of conflicting nodes may perform the steps of block 616 may be made in any suitable way, including by basing the determination on the value of each node's MAC address. For example, in some embodiments, only the mesh node with a MAC address having a higher numerical value may perform the steps in block 616 to obtain a new network address, while in other embodiments the mesh node having the lower valued MAC address may be the only node to obtain a new network address. Other embodiments may randomly select which subset of conflicting mesh nodes may obtain a new network address, based on any suitable alternative criteria.

Once a new network address suffix is determined in block 616, the process proceeds back to block 608 in which the process will attempt to use the new network address based on the new suffix, and then proceed to block 610 in which the mesh node may detect if the new network address results in any conflicts. If the mesh node determines at block 612 that a new conflict has arisen, the process continues to block 614, as discussed above.

Otherwise, if it is determined at block 612 that the network address does not conflict with any other network addresses on the mesh network, the process may then proceed to block 618, in which the mesh node may store the network address in the particular location in the same data storage medium discussed in conjunction with block 602. The method illustrated by FIG. 6 may then be finished at this point.

It is to be appreciated that a subset of the functionality ascribed to the method illustrated by FIG. 6 may be performed repeatedly by the mesh node, even if it is already using a network address and does not have a need to assign a network address to itself. For example, the method may continually check at block 610 whether the network address it is using conflicts with any other address on the mesh network.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

For example, a gateway node may act as a discovery proxy, such as a DNS proxy or as a WSD discovery proxy, broadcast and/or multicast protocols. In such examples, the gateway node may capture services that are provided outside the mesh network, and may reply to service requests within the mesh. One use of a gateway node acting as a proxy may be to allow address resolution (i.e., discovery) for computers providing services outside the mesh, such as computers providing Network Basic Input/Output System (NetBIOS) services, and to reply to other mesh nodes on behalf of the computer outside the mesh. Such address resolution may be implemented on a gateway node acting as a proxy in any suitable way, including manual configuration, or automatically discovering services outside the mesh network for which the gateway node may act as a proxy. A method similar to that used to select a default gateway node may also be used to select a gateway node that acts as a proxy for a particular service. In some embodiments, the default gateway node selected for a mesh node may be different than the selection of a default gateway acting as a proxy for a particular service, as the invention is not limited in this respect.

Additionally, in some embodiments, the same protocol used for the advertising of a gateway node throughout the mesh network may also be used by other mesh nodes advertising other types of services, in other embodiments, even if nodes advertising other types of services do not use the same advertisement protocol as a gateway node, aspects of the gateway advertisement protocol or the format of the advertisements discussed in conjunction with gateway nodes may also apply to other service advertisements. For example, each mesh node receiving a service advertisement may obtain characteristics contained within the advertisement to compute a metric associated with a path between itself and the node providing a service, and may use that path to select a node from which it will receive a service. For example, if multiple mesh nodes advertise printing services, a mesh node receiving the advertisements may select a default printing service node, based on characteristics associated with a path from the mesh node to each node providing printing services.

As another example, the service provider nodes may distribute advertisements at periodic intervals, and may include the interval in the service advertisement. Based on whether or not it has received an advertisement in an expected time interval from a node providing a service, a mesh node may be able to track mesh nodes that currently provide services in the mesh network in a dynamic way that takes into account changed conditions in the mesh, such as the departure or arrival of a mesh node.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method performed on a computing device, the method comprising:
receiving, by the computing device via a layer three or above networking protocol, a service advertisement from within a mesh network;
converting, by the computing device, the received service advertisement from the layer three or above networking protocol to a layer two networking protocol; and
advertising, by the computing device via the layer two networking protocol, the converted service advertisement on the mesh network, where the converted service advertisement as advertised is aggregated with other converted service advertisements for other services provided by the mesh network.

2. The method of claim 1 where the advertising comprises broadcasting, on the mesh network via the layer two networking protocol, the converted service advertisement.

3. The method of claim 1 where the advertising comprises:
receiving, via a second layer two networking protocol from a device outside the mesh network, a request for a service corresponding to the received service advertisement; and
responding, to the requesting device via the second layer two networking protocol, the received service advertisement.

4. The method of claim 1 where the layer three or above networking protocol comprises a Universal Plug and Play ("UPnP") Discovery Protocol or a Web Services Discovery ("WSD") Protocol or Internet Control Message Protocol ("ICMP").

5. The method of claim 1 where the layer two networking protocol is a variant of a wireless Ethernet protocol.

6. The method of claim 1 where the service advertisement indicates a service provided by a node of the mesh network.

7. The method of claim 1 where the aggregated service advertisements are advertised in a single message that is in the form of a beacon or a wireless communication or some other format.

8. A computing device comprising:
at least one processor;
memory that is coupled to the at least one processor and that includes computer-executable instructions that, based on execution by the at least one processor, configure the computing device to:
receive, via a layer three or above networking protocol, a service advertisement from within a mesh network;
convert the received service advertisement from the layer three or above networking protocol to a layer two networking protocol; and
advertise, via the layer two networking protocol, the converted service advertisement on the mesh network, where the converted service advertisement as advertised is aggregated with other converted service advertisements for other services provided by the mesh network.

9. The computing device of claim 8 where the converted service advertisement is advertised by broadcasting the converted service advertisement on the mesh network via the layer two networking protocol.

10. The computing device of claim 8 where the service advertisement is advertised:
in response to receiving, via a second layer two networking protocol from a device outside the mesh network, a request for a service corresponding to the received service advertisement; and
by responding, to the requesting device via the second layer two networking protocol, the received service advertisement.

11. The computing device of claim 8 where the layer three or above networking protocol comprises a Universal Plug and Play ("UPnP") Discovery Protocol or a Web Services Discovery ("WSD") Protocol or Internet Control Message Protocol ("ICMP").

12. The computing device of claim 8 where the layer two networking protocol is a variant of a wireless Ethernet protocol.

13. The computing device of claim 8 where the service advertisement indicates a service provided by a node of the mesh network.

14. The computing device of claim 8 where the aggregated service advertisements are advertised in a single message that is in the form of a beacon or a wireless communication or some other format.

15. At least one computer-readable medium comprising:
at least one memory that includes computer-executable instructions that, based on execution by a computing device, configure the computing device to:
- receive, via a layer three or above networking protocol, a service advertisement from within a mesh network;
- convert the received service advertisement from the layer three or above networking protocol to a layer two networking protocol; and
- advertise, via the layer two networking protocol, the converted service advertisement on the mesh network, where the converted service advertisement as advertised is aggregated with other converted service advertisements for other services provided by the mesh network.

16. The at least one computer-readable medium of claim 15 where the converted service advertisement is advertised by broadcasting the converted service advertisement on the mesh network via the layer two networking protocol.

17. The at least one computer-readable medium of claim 15 where the service advertisement is advertised:
- in response to receiving, via a second layer two networking protocol from a device outside the mesh network, a request for a service corresponding to the received service advertisement; and
- by responding, to the requesting device via the second layer two networking protocol, the received service advertisement.

18. The at least one computer-readable medium of claim 15 where the layer three or above networking protocol comprises a Universal Plug and Play ("UPnP") Discovery Protocol or a Web Services Discovery ("WSD") Protocol or Internet Control Message Protocol ("ICMP"), or where the layer two networking protocol is a variant of a wireless Ethernet protocol.

19. The at least one computer-readable medium of claim 15 where the service advertisement indicates a service provided by a node of the mesh network.

20. The at least one computer-readable medium of claim 15 where the aggregated service advertisements are advertised in a single message that is in the form of a beacon or a wireless communication or some other format.

* * * * *